US006717135B2

(12) United States Patent
Hansen

(10) Patent No.: US 6,717,135 B2
(45) Date of Patent: Apr. 6, 2004

(54) ION MIRROR FOR TIME-OF-FLIGHT MASS SPECTROMETER

(75) Inventor: Stuart C. Hansen, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 48 days.

(21) Appl. No.: 09/976,417

(22) Filed: Oct. 12, 2001

(65) Prior Publication Data

US 2003/0071208 A1 Apr. 17, 2003

(51) Int. Cl.[7] .......................... B01D 59/44; H01J 49/00
(52) U.S. Cl. .................... 250/287; 250/282; 250/396 R
(58) Field of Search ................................ 250/287, 282, 250/396 R

(56) References Cited

U.S. PATENT DOCUMENTS

| | | | | |
|---|---|---|---|---|
| 4,694,168 A | | 9/1987 | Le Beyec et al. | |
| 4,866,279 A | | 9/1989 | Schelten et al. | |
| 5,017,780 A | | 5/1991 | Kutscher et al. | |
| 5,077,472 A | | 12/1991 | Davis | |
| 5,180,914 A | | 1/1993 | Davis et al. | |
| 5,233,189 A | | 8/1993 | Wollnik | |
| 5,331,158 A | * | 7/1994 | Dowell | 250/288 |
| 5,464,985 A | | 11/1995 | Cornish et al. | |
| 5,614,711 A | | 3/1997 | Li et al. | |
| 5,659,170 A | | 8/1997 | Da Silveira et al. | |
| 5,661,300 A | | 8/1997 | Hansen et al. | |
| 5,696,375 A | | 12/1997 | Park et al. | |
| 5,763,875 A | | 6/1998 | Kaesdorf et al. | |
| 5,814,813 A | | 9/1998 | Cotter et al. | |
| 5,821,534 A | | 10/1998 | Park | |
| 5,852,295 A | | 12/1998 | Da Silveira et al. | |
| 5,869,829 A | | 2/1999 | Dresch | |
| 5,955,730 A | | 9/1999 | Kerley et al. | |
| 5,962,851 A | | 10/1999 | Whitehouse et al. | |
| 5,994,695 A | | 11/1999 | Young | |
| 6,002,128 A | | 12/1999 | Hill et al. | |
| 6,013,913 A | * | 1/2000 | Hanson | 250/287 |
| 6,020,586 A | | 2/2000 | Dresch et al. | |
| 6,040,575 A | * | 3/2000 | Whitehouse et al. | 250/287 |
| 6,107,625 A | | 8/2000 | Park | |
| 6,204,500 B1 | * | 3/2001 | Whitehouse et al. | 250/282 |
| 6,229,142 B1 | | 5/2001 | Bateman et al. | |
| 6,469,295 B1 | * | 10/2002 | Park | 250/287 |
| 6,489,610 B1 | * | 12/2002 | Barofsky et al. | 250/287 |

FOREIGN PATENT DOCUMENTS

EP 0408288 7/1990

OTHER PUBLICATIONS

Jun Zhang and Christie G. Enke, "A Novel Non–Linear Ion Mirror With Only Three Elements", Eur. J. Mass Spectrom., 2000, vol. 6, pp. 515–522.
Jun Zhang and Christie G. Enke, "Simple Cylindrical Ion Mirror With Three Elements", Eur. J. Mass Spectrom., 2000, vol. 11, pp. 759–764.

* cited by examiner

*Primary Examiner*—John R. Lee
*Assistant Examiner*—Paul M. Gurzo
(74) *Attorney, Agent, or Firm*—Timothy H. Joyce

(57) ABSTRACT

An apparatus for receiving and reflecting ions. The ion mirror of the present invention is integral to a mass spectrometer flight tube and includes a front electrode, middle electrode, and a rear electrode. Each of the three electrodes are designed for receiving and reflecting ions. The electrodes of the ion mirror have a conductive material used for creating electric fields that retard and reflect ions back toward an ion detector. The flight tube may be made of an insulating material such as fused silica or quartz.

9 Claims, 6 Drawing Sheets

Mamyrin mirror

INTEGRAL MIRROR

ION MIRROR FOR TIME-OF-FLIGHT MASS SPECTROMETER

FIELD OF THE INVENTION

The present invention relates to the field of mass spectrometry and more particularly to an ion mirror for a time-of-flight (TOF) mass spectrometer. The invention provides an ion mirror that is integral to a flight tube of a TOF mass spectrometer.

BACKGROUND OF THE INVENTION

Ion mirrors are often used in mass spectrometers to reflect the out going ion stream back towards the detector and by so doing, reduce the physical length of the flight chamber, while maintaining the desired flight path and providing energy compensation. In a typical TOF mass spectrometer, ions are generated in an ion source, accelerated into a field free region, and then eventually sent to a detector. In order to obtain high instrument resolution, a narrow range of arrival times of isobaric ions is important. Ions with the same mass to charge ratio (m/z) should have the same arrival times. Most importantly, ions can start from different source locations and this can affect overall resolution. It is, therefore, necessary in some cases to correct the velocity variations of these differing ions. In particular, U.S. Pat. No. 5,994,695 discloses an apparatus for manipulating ions that includes a flexible substrate and a conductive material for manipulating ions. The invention includes a "stack" of plates for producing electric fields that retard the ions as they pass through the apparatus. This design or "stack" has been used in the mass spectrometry field for producing improved resolution in mass spectrometers. In addition, steps have been taken to reduce the number of plates in "stacks" to provide for more efficient apparatus design with improved ion resolution. In particular, mirrors with only three-cylindrical elements have been designed that achieve improved off-axis homogeneity compared with other conventional simple geometry mirrors (Zhang and Enke, *Jour. Of Am Soc. Mass Spect.,* 2000, 11, 759–764).

As discussed above, when the time spent in the mirror is optimally adjusted, all ions with the same m/z arrive at the detector at the same time despite differences in kinetic energy. A number of attempts have been made to develop a mirror that will provide the best means of producing consistent arrival times. Theoretically, the ideal type of instrument would be a "perfectron" that could correct arrival times over a large or diverse range of kinetic energies (A. L. Rockwood $34^{th}$ AMS 1986). Perfectrons have a quadratic axial potential distribution ($V_x$=a$x^2$), where $V_x$ is the axial potential at any depth x, and a, is a constant. The total flight time is defined as $T_{total}$=k$m^{1/2}$ and is only proportional to the square root of m/z. Perfectrons, however, suffer from a number of limitations including lack of field free ion drift regions, and the need for many electrodes throughout the drift region's separation of ion source, ion mirror and ion detector. In addition, ideal field shape has not been obtained with an ion beam with finite width.

Other kinds of "time-focusing" arrangements subject the ions to time-varying fields that have the effect of decelerating the faster ions and accelerating the slower ions with the aim of equalizing the flight times of all ions having the same mass. None of these known time-focusing arrangements is completely effective and, in practice, the flight times of ions that have the same mass still exhibit an energy dependency, and thus reducing the mass-resolving power of the spectrometer.

In addition to the mirrors discussed above, a number of effective non-ideal mirrors have been designed. These mirrors can be classified as being both linear and non-linear according to the electric field distribution along the mirror axis. One type of ion mirror subjects the ions to a static electric field, and an example of this is the "reflectron", described by B. A. Mamyrin, V. I. Karatev, D. V. Schmikk and V. A. Zagulin in Soviet Physics JETP 45, 37 (1973). The reflectron subjects the ions to a uniform electric field in two regions so as to cause their deceleration and reflection. The more energetic ions penetrate deeper into the field region than the less energetic ions. With a suitable choice of field parameters, it is possible to arrange that ions having different energies, but the same mass, arrive at a detector at closely the same time. A gridded element orthogonal to the mirror axis is used to separate each linear electric field from the others. It should be noted, however, that the larger the difference of field gradients on either side of the grid, the more likely the opportunity for mirror distortions. Although these linear ion mirrors are generally easier to fabricate, they still lack the mass resolution that can be obtained with non-linear mirrors.

The above-described mirror designs suffer from a number of problems. For instance, the plates used in the apparatus may often be spaced imprecisely, or are not aligned appropriately. It would be desirable, therefore, to provide an apparatus in which each of the electrodes can be easily aligned and mounted with permanent high precision and accuracy. It would also be desirable to provide a mirror in which the electrodes that are used in the ion beam transmission are few in number and are integral to the ion mirror substrate or flight tube and do not need to be fabricated separately. These and other problems present in the prior art have been obviated by the present invention.

SUMMARY OF THE INVENTION

In general, the invention provides an ion mirror for a mass spectrometer. The ion mirror is integral to a flight tube of a mass spectrometer and comprises a front electrode, middle electrode and a rear electrode. The three electrodes comprise a conductive material and are designed for receiving ions and creating an electric field that retards and reflects ions. The flight tube may comprise an insulating material such as fused silica or a quartz material.

DETAILED DESCRIPTION OF A PREFERRED EMBODIMENT OF THE INVENTION

Although other applications for the invention are readily apparent to one of knowledge in the art, the exemplary use of the invention in a mass spectrometer is described herein, because the unique and novel features of the invention are advantageous to the performance of such an instrument. In addition, although the invention is described in a TOF mass spectrometer, the invention should not be construed to be limited to this type of mass spectrometer alone. Other applications are possible in different instruments of varying design.

Overview and Definitions:

Before describing the present invention in detail, it is to be understood that this invention is not limited to specific compositions, gases, process steps, or equipment, as such may vary. It is also to be understood that the terminology used herein is for the purpose of describing particular embodiments only, and is not intended to be limiting.

It must be noted that, as used in this specification and the appended claims, the singular forms "a", "an" and "the" include plural referents unless the context clearly dictates otherwise. Thus, for example, reference to "an ion" includes more than one ion, reference to "an electrode" includes a plurality of electrodes and the like.

In describing and claiming the present invention, the following terminology will be used in accordance with the definitions set out below.

The term "ion source" is used herein to refer to any device that can deliver ions to the invention. In the following, use of an ion source in a TOF mass spectrometer is described and is one embodiment of an ion source. A person of skill in the art will easily recognize that there are many other ion source embodiments to which the invention can be applied.

The term "integral" refers to being disposed or positioned in or on, attached to, adapted for, integrated with, contacting or a permanent part of. For instance, an ion mirror that is integral to a mass spectrometer or flight tube may be inserted into the flight tube, attached to the flight tube, contacting the flight tube or adapted to it. The ion mirror may also comprise a part of the flight tube. When an ion mirror comprises part of a flight tube its electrodes may be applied as a coating to the entire flight tube or a portion of the flight tube. This should be construed broadly to include a variety of intermediate substrates or surfaces that may also be used between, on top of or contacting the coating and the flight tube. Lastly, an integral ion mirror may also serve the dual purpose of being both a flight tube and an electrode or plurality of electrodes.

Figure 1:
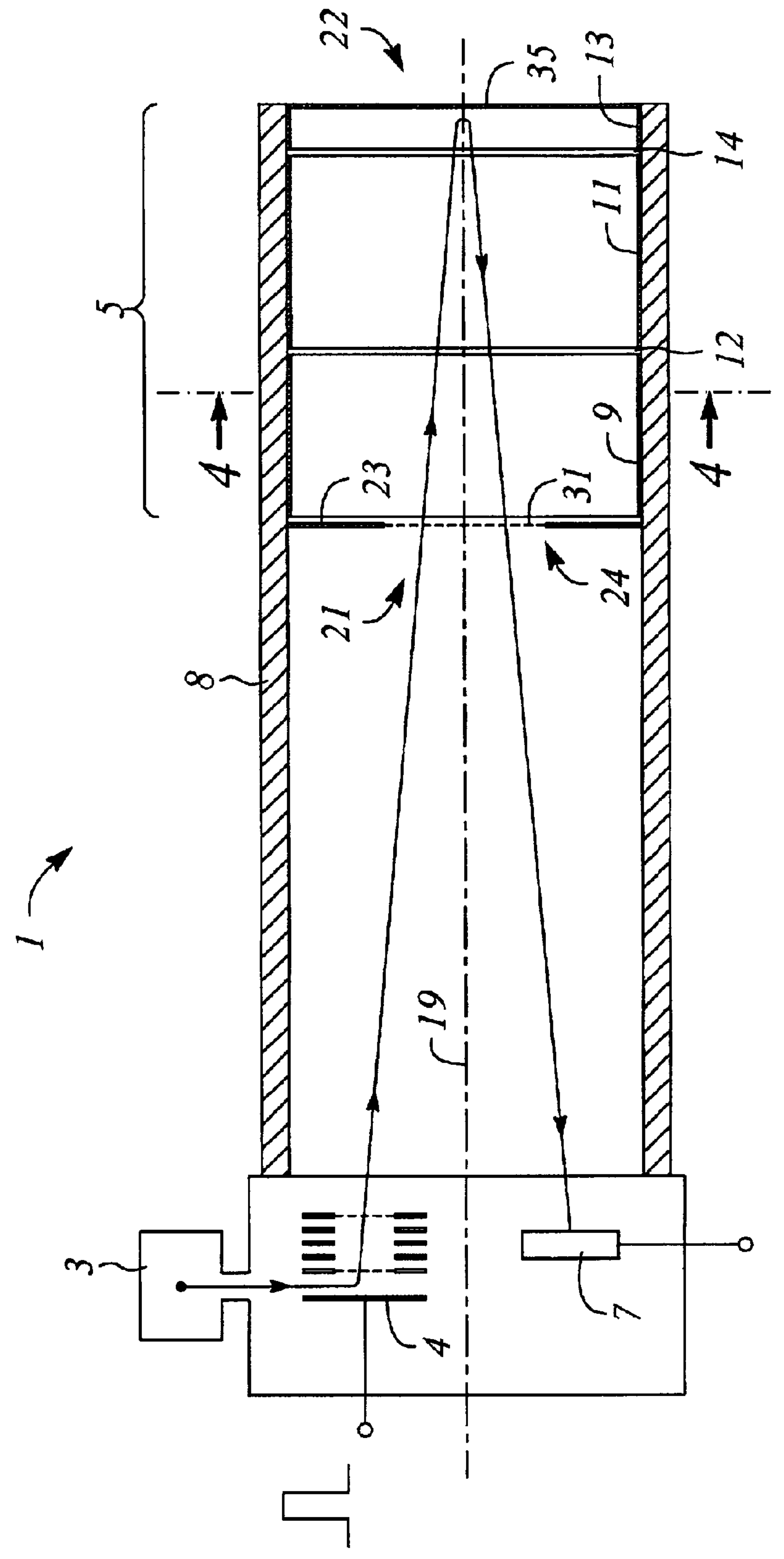
FIG. 1 shows a side elevation of the present invention in a TOF mass spectrometer.

FIG. 1 shows a side elevation of the present invention in a TOF mass spectrometer 1. The mass spectrometer 1 of the present invention comprises an ion source 3, an ion pulser 4, an ion mirror 5, and an ion detector 7. The ion source 3 is designed for generating and accelerating ions along a flight path. The ion mirror 5 is disposed between the ion source 3 and the ion detector 7 and is designed for receiving and reflecting ions that are produced by the ion source 3. Ions that are produced by the ion source 3 travel adjacent to a longitudinal axis 19 and are then reflected back at an angle to reach the ion detector 7. The longitudinal axis 19 runs along the entire flight tube 8 and the field free region of the instrument and through the ion mirror 5. The flight tube 8 is positioned downstream from the ion source 3 and is used for guiding ions to and away from the ion mirror 5.

Figure 2:
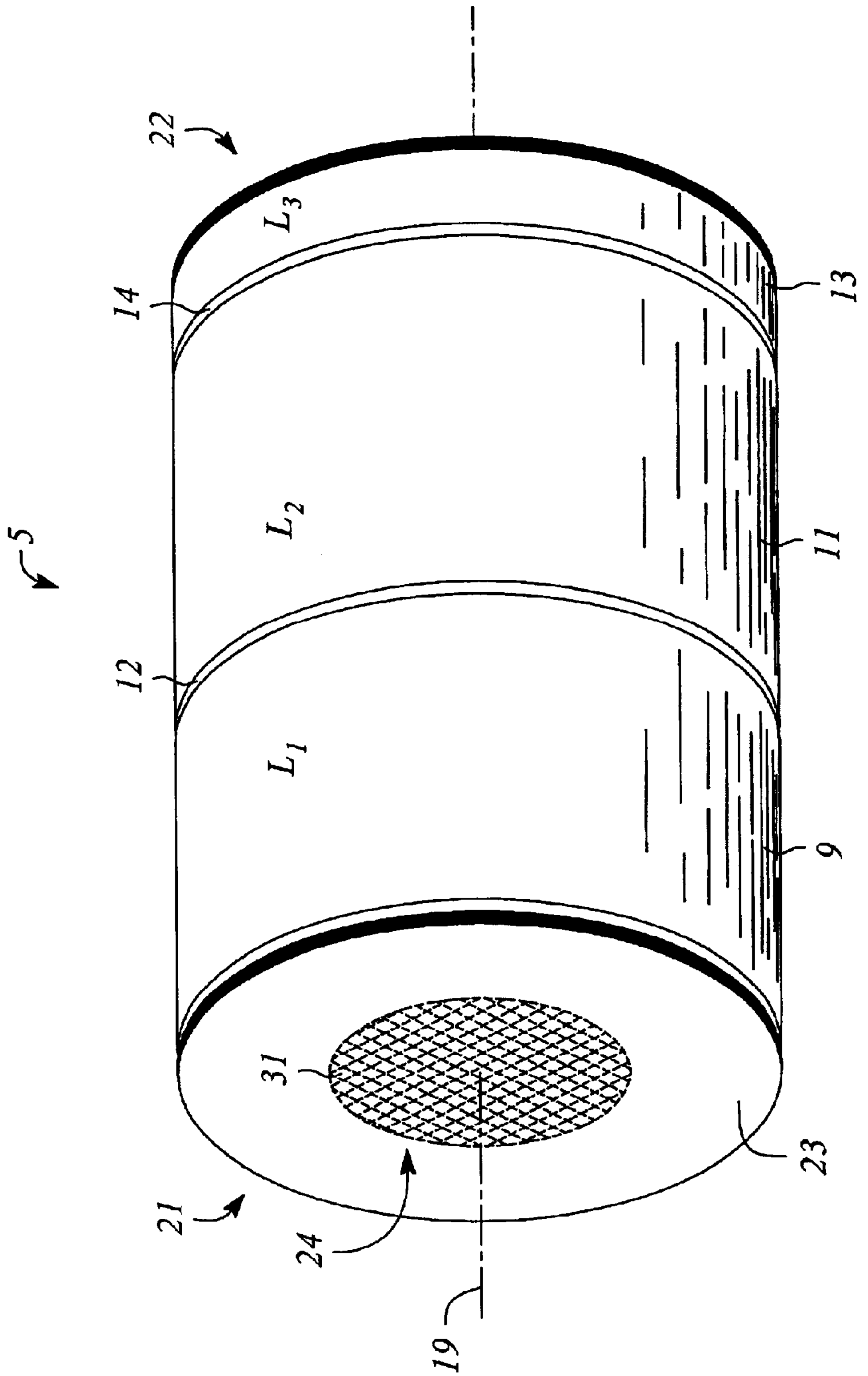
FIG. 2 shows a perspective view of the present invention.

The ion mirror 5 is integral to the flight tube 8 of the mass spectrometer 1. In a first embodiment of the invention, if the ion mirror 5 is to be inserted into the flight tube 8, all components are enclosed by the instrument as shown in FIG. 1. In a second embodiment of the invention, when the ion mirror 5 comprises a part of the flight tube 8, it can not be removed from the instrument (this embodiment is discussed in more detail below and shown in FIG. 4). A back plate 35 is used to secure the ion mirror 5 within the mass spectrometer 1. The back plate 35 may be part of the mass spectrometer 1, or a separate component that is fastened onto the instrument. As shown in FIGS. 1–2 the back plate 35 is also the end of the flight tube 8.

The flight tube 8 of the mass spectrometer 1, may comprise a variety of different materials and shapes. The use of low temperature coefficient of expansion materials such as quartz, ceramic, glass, or fused silica have proven effective in maintaining a fixed flight path over a range of environmental temperature changes, thus preserving the mass axis calibration of the instrument. The flight tube 8 may be designed in any shape that may effectively form an enclosure around the electrodes 9, 11 and 13 and act as an insulator with a low temperature coefficient of expansion. In addition, in another embodiment, the flight tube 8 may be metallic with an insulating inner surface applied for use as the insulating substrate for the electrodes 9, 11 and 13. The flight tube 8 comprises a material selected from the group consisting of quartz, glass, fused silica and ceramic. Other insulating materials that are well known in the art may also be used.

FIG. 2 shows a perspective view of the ion mirror 5 of the present invention. In this embodiment of the invention, the ion mirror 5 is designed for insertion into the flight tube 8 (FIG. 1 shows how the ion mirror 5 in this embodiment fits into the flight tube 8). The ion mirror 5 comprises a front electrode 9, a middle electrode 11, a rear electrode 13, and an optional grid plate 23. Front electrode 9 is generally positioned closest to the grid pate 23. The middle electrode 11 is generally positioned downstream from front electrode 9. The rear electrode 13 is generally positioned downstream from the middle electrode 11 and closest to the back plate 35.

The grid plate 23 is designed to contact the front electrode 9 and comprises an aperture 24 for receiving and reflecting ions, as well as a grid frame 31. The grid plate 23 is attached to the flight tube 8 by means of a fastener (not shown in FIGS.), and has an aperture 24 that the grid frame 31 is stretched across. The grid frame 31 is attached to the ion mirror 5 and can be as large as the aperture is required in practice. The grid frame 31 also serves as an internal electrostatic shield. In order to minimize field penetration of the electric field into the flight tube 8, the grid frame 31 is attached to the internal side of the front electrode 9. The ion mirror 5 also comprises a first end 21 for receiving and transmitting ions substantially along the longitudinal axis 19 of the ion mirror 5, and second end 22 that is closed ended. As described above, the second end 22 is closed ended by attachment of the back plate 35.

Figure 3:
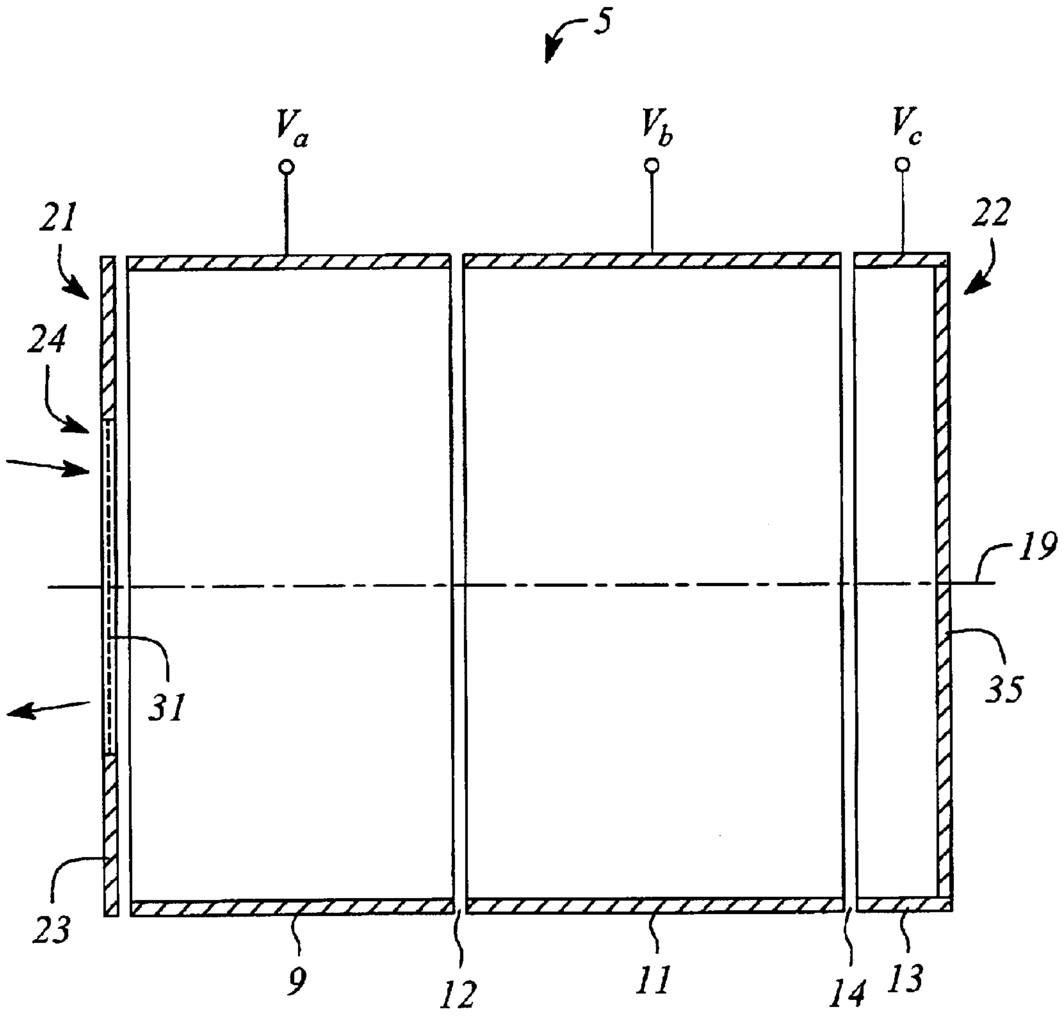
FIG. 3 shows a cross-sectional view of the present invention.

Referring to FIGS. 1–3, the electrodes 9, 11 and 13 are integral to the flight tube 8. Each of the electrodes 9, 11 and 13 is designed for receiving ions and creating an electric fields that retards and reflects ions back towards the flight tube 8 and the ion detector 7. The ion mirror 5 has internal conducting segments L1, L2 and L3, L1, L2 and L3 define the length of the electrodes 9, 11 end 13, respectively. Segment L1 is extended past the grid frame 31. L1 and L2 are approximately similar in size and shape. The electrodes 9 and 11, 11 and 13 are separated by first space 12 and second space 14 respectively. The lengths of L1, L2 and L3 may be altered to produce varying electric fields. Segment L2 has its electrical connection by means of a single hole in the flight tube 8 (not shown in FIGS.). L3 serves as the rear segment and is in electrical contact with the back plate 35. The invention and segment design, number, size and material (resistive or conductive) can be varied to suit conventional multi-segment designs or new layouts as needed. In addition, the aspects of the invention may be applied or are applicable to other components like the ion pulser 4 which is traditionally built from a "stack" of separate ports like the mirror, and charged particle lenses (e.g. Einzel lenses) and deflectors etc. The above invention also has application in ion mobility spectrometers.

As discussed above, the electrodes 9, 11 and 13 may be similar or varied in size and shape. The electrodes shown in all the figures are cylindrical in shape. Other shapes include square, elliptical, circular etc. The shape of the electrodes determines the approximate shape of the axial electric field, while voltages applied to each of the electrodes determines the strength of the electric field and may be adjusted to fine-tune the ion mirror 5. The electrodes 9, 11, and 13 may also be altered in design or vary from each other in construction. The important quality is that they are capable of being easily aligned so that the electric fields produced by each electrode pair increasingly retards the ion beam traveling adjacent to the longitudinal axis 19. The electrodes 9, 11 and 13 may be designed of any material that is conductive or to which a potential may be applied to create an electric field. At least one of the electrodes comprises a conductive material. Conductive materials may include metals or other materials well known in the art. The metals that may be used with the present invention can be selected from the group consisting of gold, aluminum, nickel, chromium and titanium. This is an important feature of the invention. In FIG. 3, Va, Vb and Vc have not been further described and indicate that varying potentials may be applied to each of the electrodes 9, 11, and 13 to produce a desired electric field depending on the flight tube 8, length and electrode size.

Figure 4:
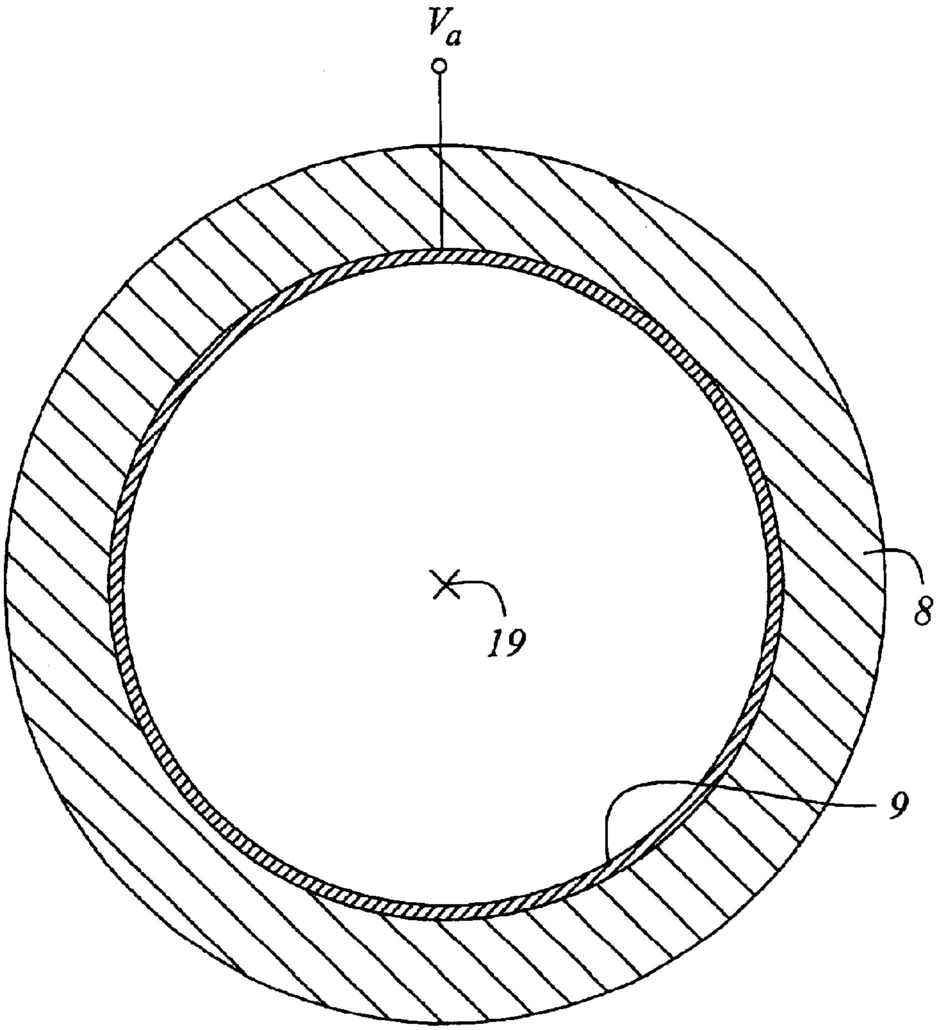
FIG. 4 shows a second cross-sectional view of the present invention.

FIG. 4 shows a cross-sectional view of the present invention taken along 4,4 of FIG. 1 and shows a second embodiment of the invention. The ion mirror 5 is integral to the flight tube 8. In this case, the electrodes 9, 11, and 13 are applied as a coating to flight tube 8. The coating may be applied to a portion of flight tube 8, or the entire flight tube 8. It is important to the invention that first space 12 and second space 14 be positioned or etched into the coating at the correct position to define the appropriate width for the electrodes 9, 11 and 13. The invention has the advantage of providing easily aligned or align able electrodes that can produce effective retarding electric fields. The coating that is applied to the flight tube 8 may be applied by any number of techniques well known in the art. At least one of the electrodes may comprise a conductive material. Conductive materials may include metals or other materials well that can be easily coated on a surface or that are well known in the art. The metals that may be used as a coating for the present invention can be selected from the group consisting of gold, aluminum, nickel, chromium and titanium.

The lengths of the three electrodes are for example 120 mm, 139 mm and 32 mm, respectively. The diameter is 298 mm. The voltages applied at each of the three electrodes are different and can be designated $V_f$, $V_m$, and $V_r$. Examples of the voltages applied at the three elements are $V_f$=0; $V_m$=1247 V and $V_r$=1897 V. The diameter of the ion mirror 5 should be as large as the mirror length for good off-axis homogeneity. In addition, the required mirror diameter depends on the aperture size occupied by the ion beam. For instance, normally the ion mirror 5 with four times the beam aperture width will provide off-axis homogeneity. Optimization of the mirror parameters (as described above) may be accomplished by 1) assigning the mirror and element lengths, the mirror diameter, reflectance angle and optimum voltage combination; 2) maintaining the optimized voltages and changing element lengths to find new optima for element lengths; 3) repeating 1 and 2 to find the optimum for a given mirror length; 4) changing the mirror length and repeating 1–3 until an optimum is reached. An analytical expression for the electric field distribution is being developed to facilitate optimization.

Having now described the apparatus of the invention, a description of the operation of the invention is now in order. In a TOF mass spectrometer, ions are generated in the ion source 3, are accelerated into a field free region by the pulser 4 and then sent to the ion detector 7 via the ion mirror 5. The ion source 3 is designed for generating and accelerating ions along a defined flight path. In mass spectrometers it is important that a narrow range of arrival times for ions with the same mass to charge (m/z ratio) be obtained for high resolution. Often times ions will start from differing locations and for this reason it is important that an apparatus such as an ion mirror be supplied so that corrections can be made to various ions with different energies. Mirror corrections are made largely by the fact that faster ions penetrate deeper into the mirror before being retarded by an electric field. Ions with lower kinetic energy do not penetrate as deeply and are retarded and reflected more quickly. Ideally, the total flight time of isobaric ions will be the same.

As mentioned above, the ion source 3 provides a stream of ions to the ion mirror 5. The ions or ion beam are directed at an angle adjacent to the longitudinal axis 19 of the ion mirror 5. The ion beam enters the ion mirror 5 at the first end 21. Once the ions have traveled past the grid frame 31 they continue further into the ion mirror 5. A number of ions may collide with the inner surface of the flight tube 8. Since the inner surface may comprise or be coated by a conductive material such as a metal, localized charge build-up is prevented. The electric field produced by each of the electrodes 9, 11, and 13 are designed to gradually retard and then reflect the ions back toward first end 21 of ion mirror 5. Ions of the ion beam are generally reflected back off-axis at an equal angle as that of the axis of approach into the ion mirror 5. The ion beam that emerges from the ion mirror 5 is then collected by the ion detector 7.

EXAMPLE 1

Figure 5:
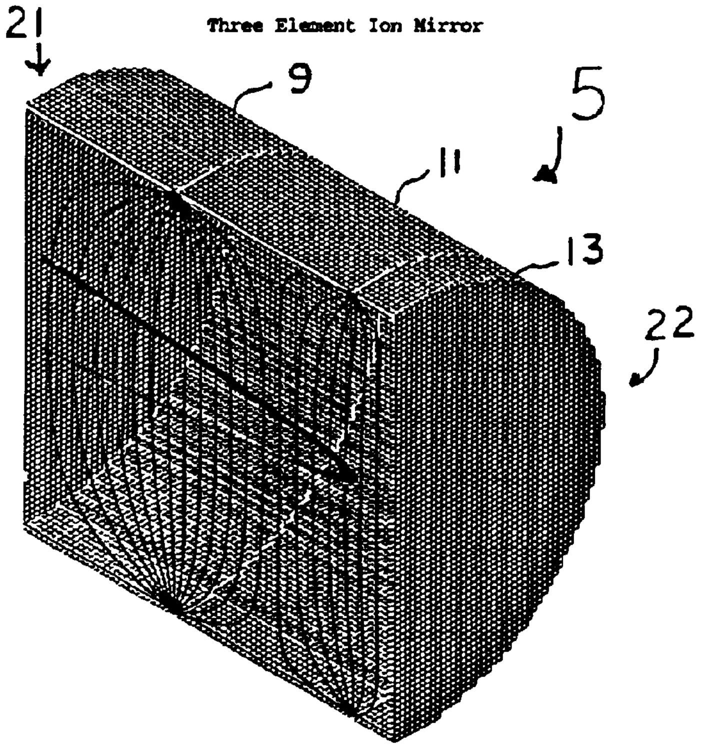
FIG. 5 shows a simulation of the present invention using the program SIMION 7.

FIG. 5 shows a simulation of the present invention and operation using the program SIMION 7 (David Dahl, INEL, Idaho Falls, Id.). The simulation shows the ion flight path from the ion source into the three element ion mirror and the reflected ion beam that returns toward the detector. In the figure the ion beam approaches (top line) and is reflected (bottom line shown). Similar simulations on ion mirrors have been conducted by Zhang and Enke, Eur. J. of Mass Spec., 6, 515–522 (2000). FIG. 5 shows the 0 V, 1247 V, and 1897 V ion mirror elements. The simulation includes 10 each, 100 Dalton ions projected to enter the mirror over a range of energies from 1500 to 1600 eV at an angle of 4.5 degrees to the flight path axis. The voltage contours or isopotentials are shown in the diagram.

EXAMPLE 2

Figure 6:
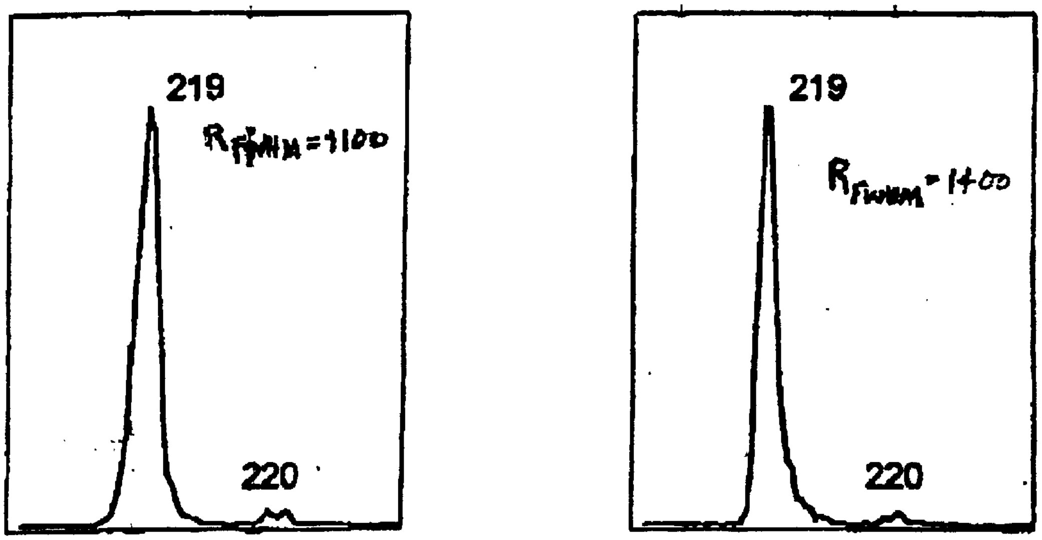
FIG. 6 shows a comparison of results acquired using the present invention and a Mamyrin mirror.

FIG. 6 shows the experimental results obtained using a Mamyrin mirror and the present invention. An electron impact TOF mass spectrometer system was employed as the platform for the tests. The mirror dimensions were about eight inches in width and six inches in height. The depth of the mirror occupied about six inches along the beam axis and was only slightly longer than a Mamyrin mirror designed for the same geometry. The data shown are from a rectangular mirror with aluminum plates, but a cylindrical assembly can also be used and is more practical for construction purposes.

Using the above described experimental parameters, a resolution of 1100 FWHM for m/z 219 of perfluorotributylamine (PFTBA) using the Mamyrin mirror and 1400 using the present invention. The ion abundances were comparable. The data was obtained using a 200-MHZ data acquisition system using 8 second integrations (80,000 sums). Peak heights were approximately 200,000 in each case. For sample introductions, source pressure was raised from approximately 1 μtorr (base pressure) to 12 μtorr (with PFTBA) using a manually operated leak valve.

Peak shapes for the two cases are shown in FIG. 6. Note that the results show higher resolution for the mirror of the present invention. The invention has the added advantages of insulation using the fused silica or quartz tube, ease of incorporation into the TOF mass spectrometer, and charge dissipation due to an internal surface that comprises a conductive material.

Clearly, minor changes may be made in the form and construction of the invention without departing from the scope of the invention defined by the appended claims. It is not, however, desired to confine the invention to the exact form herein shown and described, but it is desired to include all such as properly come within the scope claimed.

We claim:

1. A mass spectrometer, comprising:

(a) an ion source for generating and accelerating ions along a flight path;

(b) a flight tube downstream from said ion source for shielding said ions said flight tube having an electrically insulating inner surface;

(c) an ion mirror abutting said inner surface and comprising:

a front electrode, middle electrode and a rear electrode, each of said electrodes designed for receiving ions and creating an electric field which retards and reflects said ions; and (d) an ion detector for receiving ions reflected from said ion mirror.

2. A mass spectrometer as recited in claim 1, wherein at least one of said electrodes comprises an electrically conductive material.

3. A mass spectrometer as recited in claim 1, wherein said electrically conductive material is a metal.

4. A mass spectrometer as recited in claim 3, wherein said metal is selected from the group consisting of gold, aluminum, nickel, chromium and titanium.

5. A mass spectrometer as recited in claim 3, wherein said metal is selected from the group consisting of quartz, glass, fused silica and ceramic.

6. A mass spectrometer as recited in claim 1, wherein the electric field produced by said ion mirror deviates only slightly from a linear mirror with constant field strength.

7. A mass spectrometer comprising:

(a) an ion source for generating and accelerating ions along a flight path;

(b) a flight tube downstream from said ion source for shielding said ions, said flight tube having an insulating inner surface;

(c) an ion mirror abutting and fixed to said inner surface and comprising: a front electrode, a middle electrode and a rear electrode, each of said electrodes being designed for receiving said ions and for creating an electric field that retards and reflects said ions; and (d) an ion detector for receiving ions reflected from said ion mirror.

8. The mass spectrometer as recited in claim 7, wherein said inner surface comprises a portion between said ion source and said ion mirror.

9. The mass spectrometer as recited in claim 8, wherein said front electrode faces said ion source and said ion detector faces said front electrode.

* * * * *